United States Patent [19]
Safreed, Jr.

[11] Patent Number: 5,535,994
[45] Date of Patent: Jul. 16, 1996

[54] COMPOSITE AIR SPRING PISTON

[75] Inventor: Carl K. Safreed, Jr., North Canton, Ohio

[73] Assignee: The Goodyear Tire & Rubber Company, Akron, Ohio

[21] Appl. No.: 159,170

[22] Filed: Nov. 30, 1993

[51] Int. Cl.⁶ .................................................. F16F 9/04
[52] U.S. Cl. ........................................ 267/64.27; 267/122
[58] Field of Search ............................ 267/122, 64.27, 267/64.23, 64.24, 64.19, 64.21

[56] References Cited

U.S. PATENT DOCUMENTS

| | | | |
|---|---|---|---|
| 4,506,910 | 3/1985 | Bierens | 280/711 |
| 4,718,658 | 1/1988 | Geno | 267/64.27 |
| 4,787,607 | 11/1988 | Geno et al. | 267/122 |
| 4,890,823 | 1/1990 | Koschinat et al. | 267/122 |
| 5,005,808 | 4/1991 | Warmuth, II et al. | 267/64.27 |
| 5,060,916 | 10/1991 | Koschinat et al. | 267/122 |
| 5,180,146 | 1/1993 | Schneider et al. | 267/122 |
| 5,201,500 | 4/1993 | Eckman et al. | 267/122 |

FOREIGN PATENT DOCUMENTS

| | | | |
|---|---|---|---|
| 0264573 | 4/1988 | European Pat. Off. | 267/64.27 |
| 0296445 | 12/1988 | European Pat. Off. | 267/64.27 |

Primary Examiner—Matthew C. Graham
Attorney, Agent, or Firm—Marc R. Dion, Sr.; J. D. Wolfe

[57] ABSTRACT

The airspring piston of this invention in some of its aspects comprises a cylindrical center portion whose lower end defines a piston bottom including a retainer for a fastener attaching said piston to an unsprung portion of a vehicle, an annular dome portion extending radially outward from a top end of cylindrical portion and ending at its outer periphery with a downwardly and outwardly arcuate bead retention portion which in turn concludes with a skirt portion which extends downwardly and flares outwardly and further downwardly to a point where the end of the skirt portion is a predetermined distance above said piston bottom. The piston may contain a plurality of circumferentially spaced ribs and a plurality of circumferentially spaced gussets to strengthen the piston.

11 Claims, 2 Drawing Sheets

COMPOSITE AIR SPRING PISTON

FIELD OF INVENTION

This invention relates to a composite air spring composed of a piston and its assembly to distribute forces radially to a skirt portion and vertically to a cylindrical center portion of the piston. More particularly, this invention relates to a rolling lobe air spring where the piston skirt flares downward and has an essentially uniform thickness. This invention provides a rolling lobe air spring of light weight and good utility. A specific feature of this composite air spring is a unique piston that can be formed as a single molding operation to handle the maximum peak load through retaining members and the metal stud in the bottom center of the piston.

Thus, the rolling lobe airspring comprises an upper retainer, a flexible sleeve connected at one of its ends to the upper retainer and at its opposite end to an airspring piston, said airspring piston comprising a cylindrical center portion whose lower end defines a piston bottom including means for retaining a fastening means for attaching said piston to an unsprung portion of a vehicle, an annular dome portion extending radially outward from a top end of said cylindrical portion and ending at its outer periphery with a downwardly and outwardly arcuate bead retention portion which in turn concludes with a skirt portion which extends downwardly and flares outwardly and further downwardly to a point where the end of the skirt portion is a predetermined distance d above said piston bottom.

BACKGROUND ART

Rolling lobe airsprings are employed as shock absorbers on trucks and buses and exist in various forms. It has been suggested that the pistons may be made lighter with less weight from engineering plastics such as are used in sheet molded compounding. In order to reduce the weight and thickness of the skirt portion of a piston, this invention eliminates the vertical shock load forces from being bourne by the skirt.

BRIEF DESCRIPTION OF THE DRAWINGS

The objects and advantages of this invention more readily may be seen and understood by reference to the drawings with the following description, in which.

SUMMARY OF THE INVENTION

The assembly of this invention is primarily characterized by having the bottom bead of the sleeve attached to the bead retention portion of the piston near its top so that the meniscus of the sleeve can roll down the piston skirt and, thus, transmit the radical forces generated during shock absorption to the skirt with the vertical compressive forces being transmitted through the bottom of the piston 13. The metal stud in the bottom of the piston is used to attach the piston. This is accomplished by having the end 19 of the skirt 20 stop a distance d above the bottom of the cylindrical center portion 13. Where d is about 0.2 to 1 inch above the bottom of the piston. Thus, the skirt strength requirement essentially is limited to support of the radial load from the crease of the inflated flexible member or sleeve rolling thereon. The strength of the skirt may be reduced as it does not need to support the vertical forces generated. Hence, this construction reduces or eliminates the need to provide as much reinforcing or to make the skirt as thick as usual and allows for a greater degree of flare or even a raised or floating skirt. Therefore, this invention provides a lighter and more compact air spring which is easy to fabricate as it can be molded in one step with a two- or three-piece mold.

DESCRIPTION OF THE PREFERRED EMBODIMENTS

Figure 1:
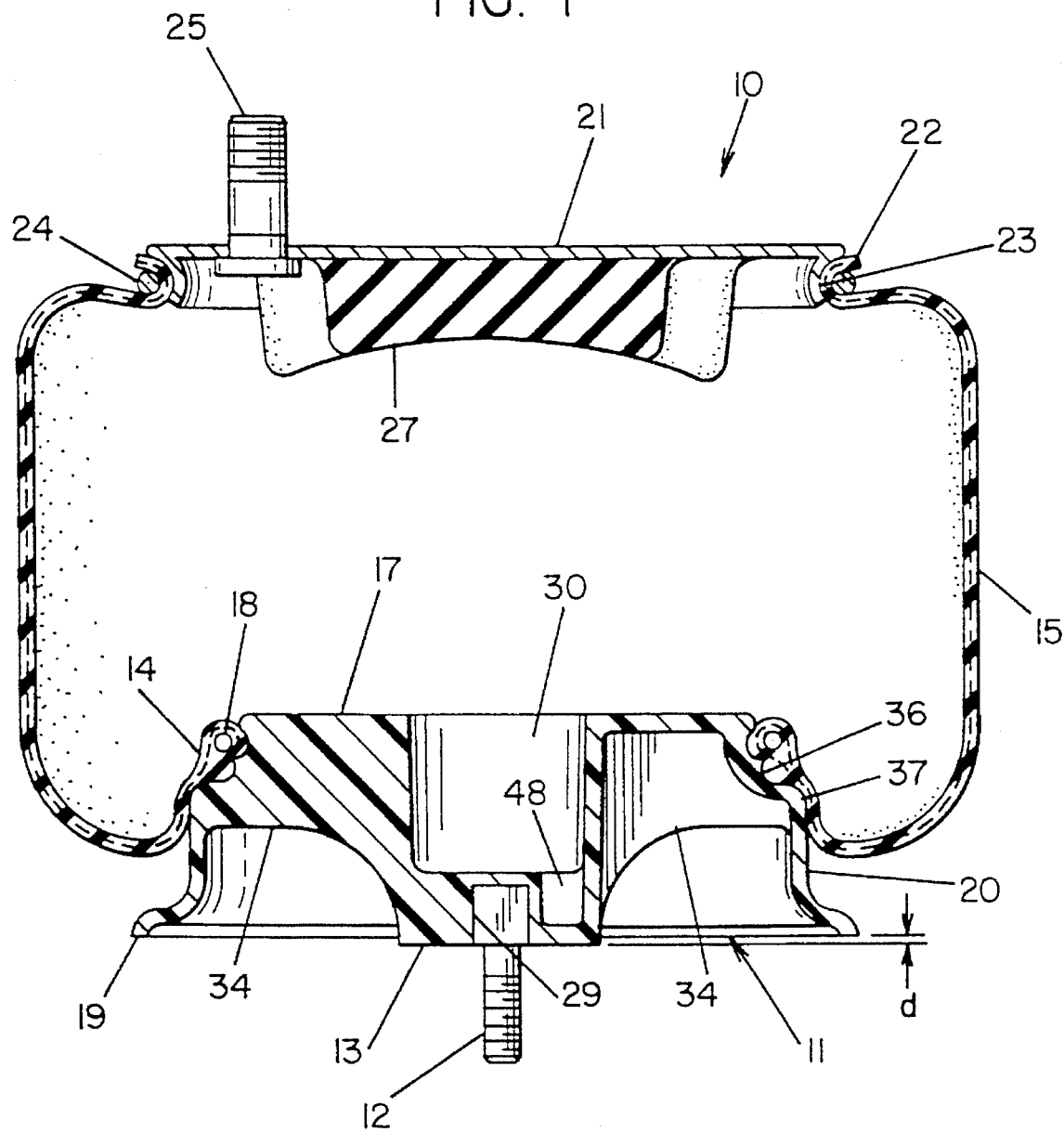
FIG. 1 is an axial cross-section through the composite air spring.
Figure 3:
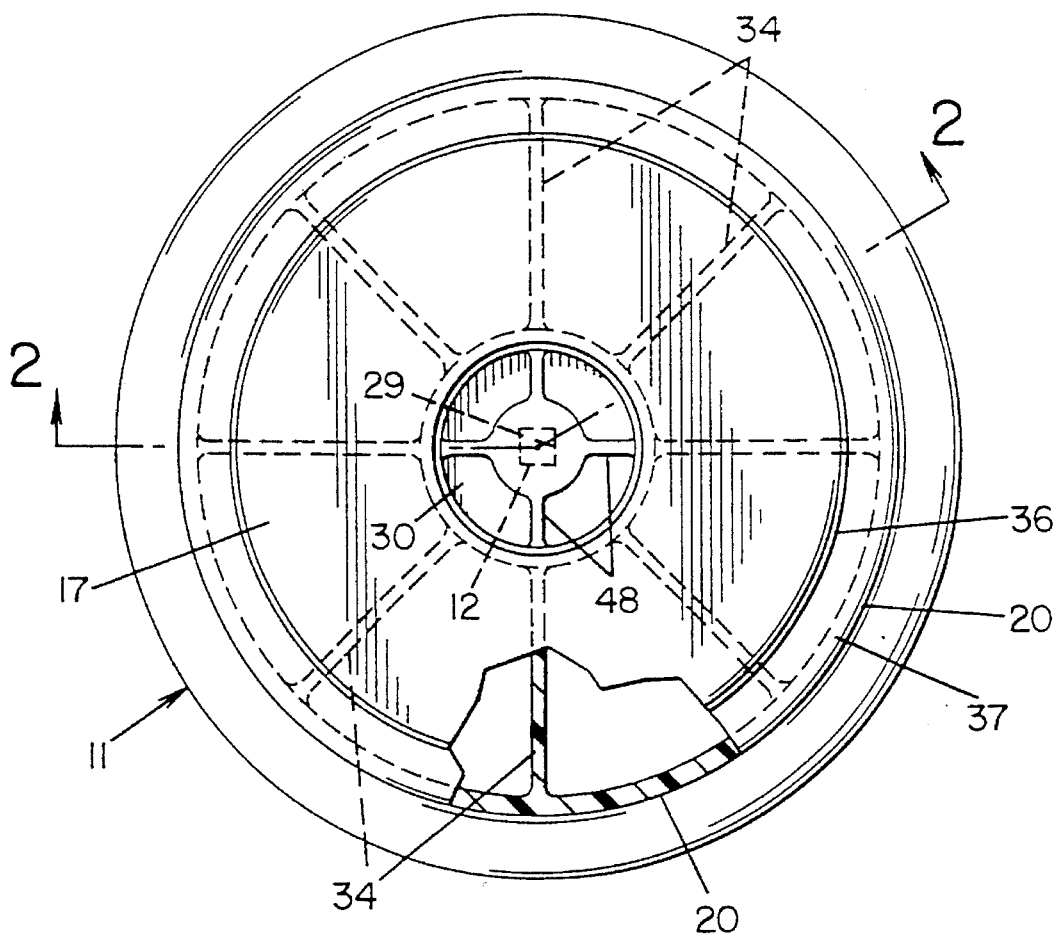
FIG. 3 as a top plan view of the piston of FIG. 2 shown with parts broken away.

By referring to FIG. 1 of the drawings, the nature of this invention may be seen with greater clarity. For instance, the general composite 10 is shown with the piston 11 in cross-section with the steel stud 12 or other retaining means molded in the bottom 13 of the cylindrical center portion 30. The sleeve 15 is shown with a beaded end 14 having bead 18 or crimp ring to attach to the dome 17 of the piston at the bead retention portion 36. This attachment of the sleeve 15 to the top of the piston allows the lobe to roll up and down on the flared portion of skirt 20 of the piston 11 in response to the load transported to the vehicle body from the axle.

The sleeve 15 of this invention may be made of plied up cured elastomeric coated fabric in the well known manner. In the preferred case, the sleeve is attached to the retainer 21 as shown in FIG. 1 where the upper end 22 of the sleeve 15 preferably is held in a groove 23 by an external crimp ring 24 to give an air tight seal between the sleeve and the retainer. Also, the groove and external crimping allows easy assembly of the sleeve to the retainer and, likewise, to the piston at the other end of sleeve 15 by bead ring 18.

The retainer as shown in FIG. 1 has an air inlet 25 such as a standard air valve for fastening an airline (not shown) to inflate the pneumatic sleeve 15 in an air spring assembly to render it capable of supporting the shock of the load.

The retainer is shown also with a jounce bumper 27 of elastomer material attached to its underside. Preferably, the jounce bumper is of relatively hard rubber to receive the maximum peak load or shock when the air spring bottoms out and the jounce bumper contacts the piston as shown in the dotted outline of FIG. 2. The jounce bumper is usually vulcanized or cemented to the underside of the retainer in the well known manner and in this embodiment to contact the dome of the piston when in the bottomed-out state.

Referring again to FIGS. 1 and 2, it will be seen that the molded-in place steel stud 12 is positioned in a well 29 formed in the cylindrical center portion 30 surrounded by molded plastic to give an air tight rolling lobe air spring. Reinforcing plastic ribs 34 and gussets 48 are formed in the piston. It should be understood that a sheet molded compound (SMC) of 30% glass vinyl ester sheet may be used to strengthen the cylindrical center portion load bearing member and to give the piston the ability to function without any supplementary metal reinforcement. Generally, the entire piston, including ribs and gussets are made from the same plastic material.

The molded ribs also help to accept the maximum radial peak load as the piston moves upward and the rolling lobe meniscus begins rolling down the piston skirt. It should be noted that the skirt shoulder 37 contacts the sleeve as the piston moves relative to the retaining member. Thus, as the distance between the top of the piston and the retaining member decreases the area of contact between the lobe meniscus and the skirt increases due to skirt flare to reduce the unit radial load transmitted to the skirt and thereby helps distribute the load on the skirt structure member to reduce the need for heavily reinforcing the skirt.

From the description of the drawings, it follows that the combined features of the flex member attachment, air retention, jounce bumper stop together with other air spring functions produces a composite air spring with a piston that can be one piece molded of light weight design. The piston can be readily molded or built using the standard fiberglass molding compound generally referred to as the well known SCM (sheet molded compound) or other plastic materials of like strength.

Figure 2:
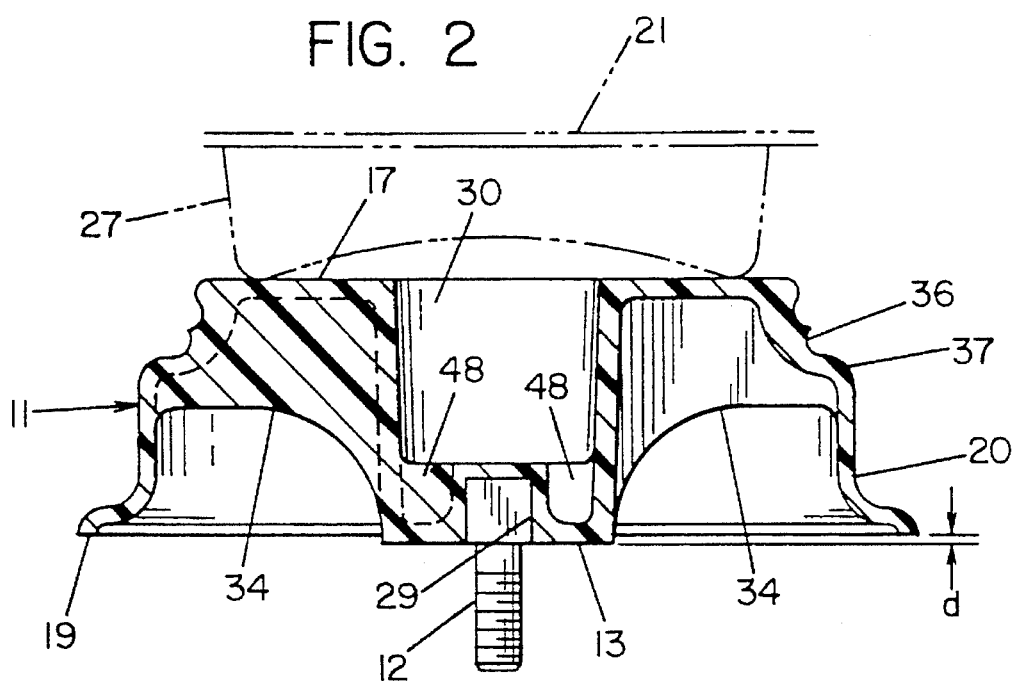
FIG. 2 is a cross-sectional view of air spring piston taken along line 2—2 of FIG. 3 with the jounce bumper in dotted outline in the bottomed-out mode.

The piston embodiment of FIG. 2 can be readily molded with multiple parting sectional molds in a single molding step. In FIG. 2, the bottom gussets 48 provide sufficient plastic to give the strength for holding the metal stud 12 and allow the piston to be fastened to an axle means (not shown).

To summarize this new piston design for a rolling lobe air spring achieves five (5) purposes, namely, (1) provides a means for easily and readily attaching of the sleeve to the piston and retainer member; (2) provides support for the rolling meniscus of the flexible sleeve while controlling the spring's dynamic characteristics by the external contour of the piston; (3) provide adequate strength to react the full dynamic jounce load, viz. 3 g., transmitted through the rubber bumper located internally to the spring; (4) provides for attachment to the lower portion of the vehicle suspension; and (5) provide air inflation retention up to 250 psig to adequately handle vehicles in class 6–8 suspension.

While certain representative embodiments and details have been shown for the purpose of illustrating the invention, it will be apparent to those skilled in this art that various changes and modifications may be made therein without departing from the spirit or scope of the invention.

What is claimed is:

1. An airspring piston comprising a cylindrical center portion whose lower end defines a piston bottom including means for retaining a fastening means for attaching said piston to an unsprung portion of a vehicle, an annular dome portion extending radially outward from a top end of said cylindrical portion and ending at its outer periphery with a downwardly and outwardly arcuate bead retention portion which in turn concludes with a skirt portion which extends downwardly and flares outwardly and further downwardly to a point where the end of the skirt portion is a predetermined distance d above said piston bottom to allow said piston bottom to be attached to upsprung vehicle without contacting the skirt end.

2. The piston according to claim 1 further comprising a plurality of circumferentially spaced ribs extending radially outward and axially upward from said cylindrical center portion to said bead retention portion and said dome portion.

3. The piston according to claim 2 further comprising a plurality of circumferentially spaced gussets extending radially inward from said cylindrical center portion to said fastening means retaining means.

4. The air spring piston of claim 1 wherein gussets extends upward from the bottom of said piston to hold an embedded stud.

5. The air spring piston of claim 1 wherein the ribs extend upward from the gussets to reinforce the skirt portion in the bead area.

6. A rolling lobe airspring comprising an upper retainer, a flexible cylindrical sleeve connected at one of its ends to the upper retainer and at a beaded opposite end to a unitary airspring piston, said airspring piston comprising a cylindrical center portion whose lower end defines a piston bottom including means for retaining a fastening means for attaching said piston to an unsprung portion of a vehicle, an annular dome portion extending radially outward from a top end of said cylindrical portion and ending at its outer periphery with a downwardly and outwardly arcuate bead retention portion which in turn concludes with a skirt portion which extends downwardly and flares outwardly and further downwardly to a point where the end of the skirt portion is a predetermined distance d above said piston bottom to cause said end to be free of direct contact with upsprung portion of vehicle when piston is attached.

7. A rolling sleeve piston type pneumatic shock absorber assembly with rolling sleeve being supported on a downward flairing skirt of the piston during shock absorbing movement comprising a rolling piston of essentially uniform thickness in flairing skirt cross section at equal height, said skirt terminating above the bottom of the piston, said sleeve having means at the top and bottom section respectively thereof for attaching said sleeve in fight manner to a retainer and to upper position of said piston above upper plane of a stud implanted material in center bottom of the piston, said stud providing means for attachment of the piston to the axle means, with bottom of said piston being a distance d below skirt termination to cause skirt determination to be free of a direct vertical support an elastomeric jounce bumper stop on under side of said retainer with means for attachment to vehicle and a means to permit pneumatic pressure adjustment on the assembly.

8. The piston of claim 7 wherein any forces imparted to said sleeve are divided into essentially vertical and radial forces as the sleeve rolls along the flaired skirt of the piston.

9. The piston of claim 7 wherein dome of the piston extends over the flairing skirt of the piston and is supported and reinforced by a series of vertical reinforcing supports positioned to form a well to hold the implanted stud with its head in the assembly in a pneumatic tight relation in the assembly upon contact with the jounce bumper.

10. The piston of claim 9 wherein the vertical reinforcing supports extend from the well to and along shoulders of the skirt to give the skirt a uplifted appearance.

11. The piston of claim 9 wherein the reinforcing vertical supports in dome from the well through shoulders of the skirt are gussets to bear the vertical forces thrust upon the top of the piston and at bottom of the well to seal in the stud from vertical impact.

* * * * *